(12) United States Patent
Backhouse et al.

(10) Patent No.: US 6,501,416 B1
(45) Date of Patent: Dec. 31, 2002

(54) ARTICLE IDENTIFICATION APPARATUS AND METHOD

(75) Inventors: Paul M Backhouse, Malvern (GB); Christopher P Barrett, Malvern (GB); Marc I J Beale, Malvern (GB); Robin Godfrey, Malvern (GB)

(73) Assignee: Qinetiq Limited, London (GB)

( * ) Notice: Subject to any disclaimer, the term of this patent is extended or adjusted under 35 U.S.C. 154(b) by 0 days.

(21) Appl. No.: 09/646,040

(22) PCT Filed: Mar. 11, 1999

(86) PCT No.: PCT/GB99/00733

§ 371 (c)(1), (2), (4) Date: Sep. 13, 2000

(87) PCT Pub. No.: WO99/48045

PCT Pub. Date: Sep. 23, 1999

(30) Foreign Application Priority Data

Mar. 19, 1998 (GB) .............................. 9805726

(51) Int. Cl.[7] ............................................. G01S 13/78
(52) U.S. Cl. .............................. 342/42; 342/44; 342/51; 342/188
(58) Field of Search .............................. 342/42, 44, 51, 342/188

(56) References Cited

U.S. PATENT DOCUMENTS

| 3,248,508 A | | 4/1966 | Bradford et al. ............... 342/44 |
| 3,488,655 A | | 1/1970 | Fortner ......................... 200/47 |
| 3,944,928 A | * | 3/1976 | Augenblick et al. ... 340/870.18 |
| 5,819,164 A | * | 10/1998 | Sun et al. .................... 455/106 |
| 6,064,320 A | * | 5/2000 | d'Hont et al. ............... 340/933 |
| 6,114,971 A | * | 9/2000 | Nysen ........................ 340/10.3 |

FOREIGN PATENT DOCUMENTS

| EP | 0 310 174 A | 4/1989 |
| FR | 2 667 694 A | 4/1992 |

* cited by examiner

Primary Examiner—John B. Sotomayor
(74) Attorney, Agent, or Firm—Nixon & Vanderhye P. C.

(57) ABSTRACT

Apparatus for the identification of articles (5) endowed with device for changing the polarization properties of the radiation, comprising a source (1) of non-randomly polarized microwave radiation, and a detector (3) for detecting the change in polarization properties of the radiation. The microwave radiation may have a first plane of polarization and, in use, the device for changing the plane of polarization properties of radiation may change the first plane of polarization to a second plane of polarization. The detector (3) for detecting the change in polarization properties of radiation may comprise a receiving antenna (4c) connected to suitable microwave detector (3), where the receiving antenna (4c) is arranged to favour reception of radiation having the second plane of polarization. For example, the transmitting (4b) and receiving (4c) antennas may be waveguide antennas. The device for changing the polarization of radiation may comprise a feature having an edge oriented at a nonzero angle to a direction parallel with, or orthogonal to, the first plane of polarization. Typically, the feature may be a linear metallic strip, or may be a feature having a crossed dipole antenna structure. The apparatus may also comprise a device for determining the orientation of the feature or features. The polarization changing device may also comprise a covert structure for preventing the changing of the polarization properties by the polarization changing device in one or more selected location, wherein the arrangement of the one or more selected location provides an identification code.

13 Claims, 3 Drawing Sheets

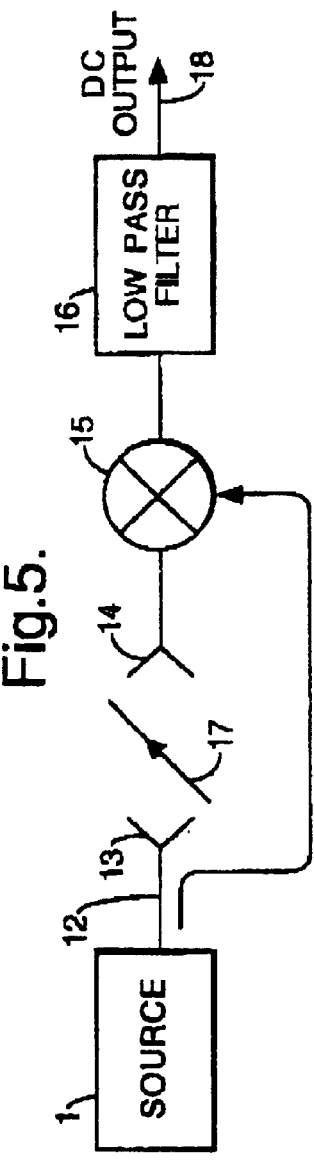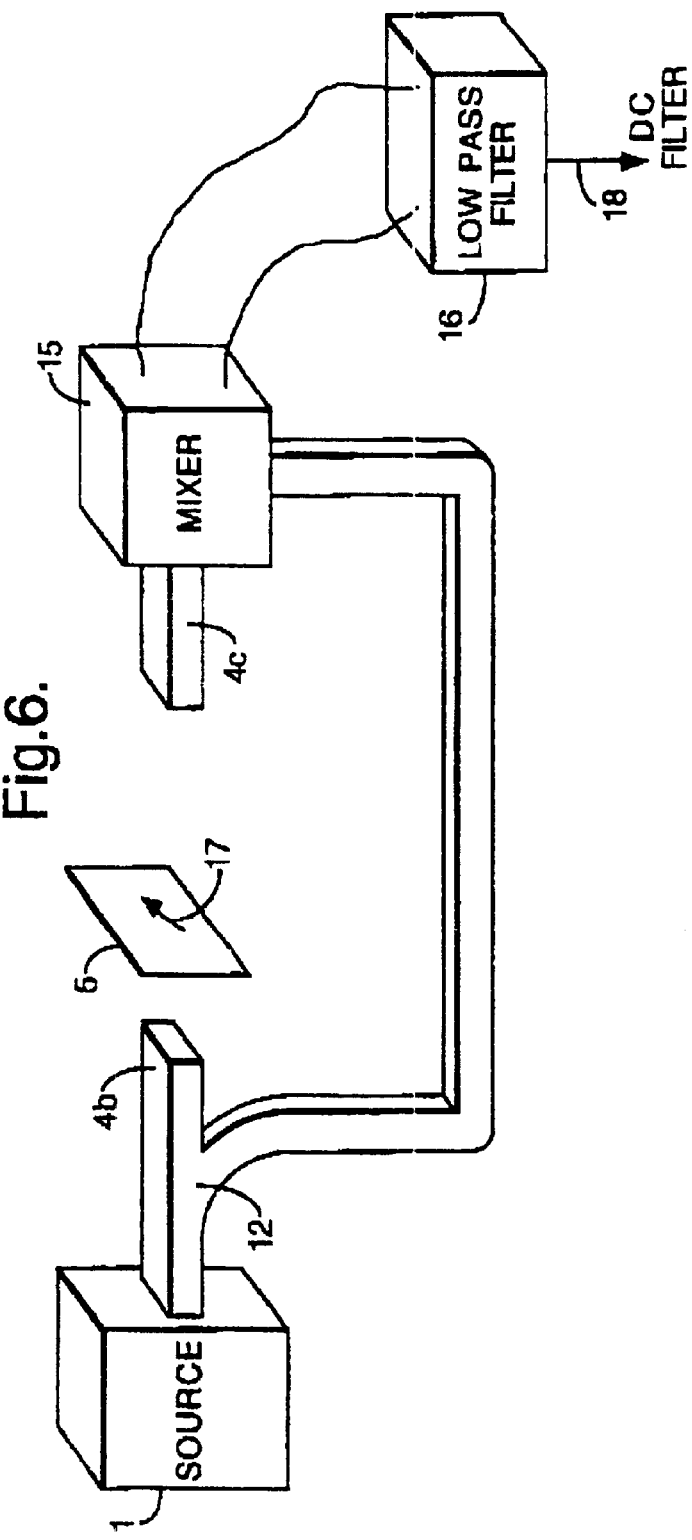

ARTICLE IDENTIFICATION APPARATUS AND METHOD

BACKGROUND OF THE INVENTION

1. Field of the Invention

This invention is concerned with apparatus and a method for the identification of articles or objects.

2. Discussion of Prior Art

Conventionally, identification of articles has been achieved by the inclusion of features on the article which can be read by some means. These might include graphically complex features or holographic features. Such features however, have the disadvantage that their presence is obviously apparent and this is not always desirable Furthermore, whilst such features can be easily identified manually, such as labels or holograms, they are more difficult to identify using automated systems. Bar codes are a commonly used machine readable identification means. However, bar codes contain a lot of information, and whilst suitable for certain applications, for example supermarket product sales, such readout systems are too slow for applications requiring very high speed identification of articles.

SUMMARY OF THE INVENTION

An object of the present invention is to provide a reliable means of identification which is not immediately apparent to the human eye and which is compatible with automated identification techniques and high speed readout systems.

It is an object of the present invention to provide a means for obtaining strong identification signals which are derived from physically robust features, created using materials which are acceptable for use on or in articles. In addition, the invention lends itself to high speed, automated checking. This is particularly advantageous when dealing with high volumes of articles.

According to the present invention apparatus for the identification of articles endowed with polarisation changing means for changing the polarisation properties of radiation incident on the article comprises, a source of non-randomly polarised microwave radiation, means for detecting the change in polarisation properties of the radiation.

The polarisation changing means may comprise means for changing the properties on transmission therethrough or reflection therefrom.

The microwave radiation may have a first plane of polarisation and the polarisation changing means may comprise means for changing the plane of polarisation to a second plane of polarisation. Preferably, the first and second planes of polarisation are substantially orthogonal.

The apparatus may comprise a transmitting antenna and a receiving antenna connected to suitable microwave radiation detecting means, the receiving antenna being arranged to favour reception of microwave radiation having the second plane of polarisation. At least one of the transmitting antenna and the receiving antenna may be a waveguide.

The polarisation changing means may comprise at least one feature having at least two pairs of dipole arms, wherein each pair of dipole arms is arranged to be substantially parallel to a different one of the first plane of polarisation or the second plane of polarisation, the feature being arranged on or within the article.

Alternatively, the polarisation changing means may comprise at least one feature having an edge oriented at a non-zero angle, θ, to a direction substantially parallel or substantially orthogonal to the first plane of polarisation. Preferably, the angle, θ, is substantially 45°. This provides the advantage that coupling of the microwave radiation having a first plane of polarisation to the waveguide connected to the detection means is maximised. For example, the one or more features may be a strip arranged on or within the article.

The polarisation changing means may comprise any one of a conducting foil, a conducting ink, a conducting oxide, a metal fibre or a carbon fibre. Alternatively, the polarisation changing means may comprise an insulating material.

The polarisation changing means may comprise covert means for preventing the changing of the polarisation properties by the polarisation changing means in one or more selected location, wherein the arrangement of the one or more selected location provides an identification code. For example, the polarisation changing means may comprise a plurality of features for changing the polarisation properties of the radiation, whereby one or more selected feature has applied thereto covert means for preventing the changing of the polarisation properties by the one or more selected feature or features. For example, the covert means for preventing the changing of the polarisation properties may comprise one or more layer of conducting material. This layer may be arranged substantially parallel to and in contact with the one or more features.

The apparatus may also comprise means for determining the orientation of the polarisation changing means. For example, the apparatus may comprise a Homodyne receiver having a transmitting antenna and a receiving antenna, arranged such that, in use, the polarisation changing means has a location between the transmitting antenna of the Homodyne receiver and the receiving antenna of the Homodyne receiver.

The polarisation changing means may comprise a plurality of features, at least one of the features being arranged to have a dissimilar orientation from the other feature or other features, whereby the arrangement of the feature orientations provides an identification code.

The apparatus may include both (i) means for determining the orientation of the means for changing the polarisation properties of the radiation and (ii) covert means for preventing the changing of the polarisation properties by the polarisation changing means. This has the advantage of providing a more complex identification code.

According to a second aspect of the invention a method for identifying articles comprises the steps of;

(i) endowing articles to be identified with polarisation changing means for changing the polarisation properties of non-randomly polarised microwave radiation, (ii) illuminating articles to be identified with non-randomly polarised microwave radiation and (iii) detecting a change in the polarisation properties of the radiation.

According to a third aspect of the invention, an article, for use in the apparatus or method of the invention, comprises polarisation changing means for changing the polarisation properties of non-randomly polarised microwave radiation for identification purposes, wherein the polarisation changing means are suitable for arrangement on or within the articles to be identified.

BRIEF DESCRIPTION OF THE DRAWINGS

The invention will now be described by way of example with reference to the following figures in which;

FIG. 5 shows how the apparatus in FIG. 4 may be arranged with the apparatus shown in FIG. 1 and FIG. 6 shows a schematic representation of a further embodiment of the invention for providing a more complex identification code.

DETAILED DISCUSSION OF EMBODIMENTS

In these examples, the radiation used is substantially plane polarised and the change in polarisation properties caused by marked or tagged objects or articles comprises a change in the plane of polarisation. This, however, should not be seen as limiting as embodiments exploiting other types of non-randomly polarised radiation, such as circularly polarised radiation, may be used.

Figure 1:
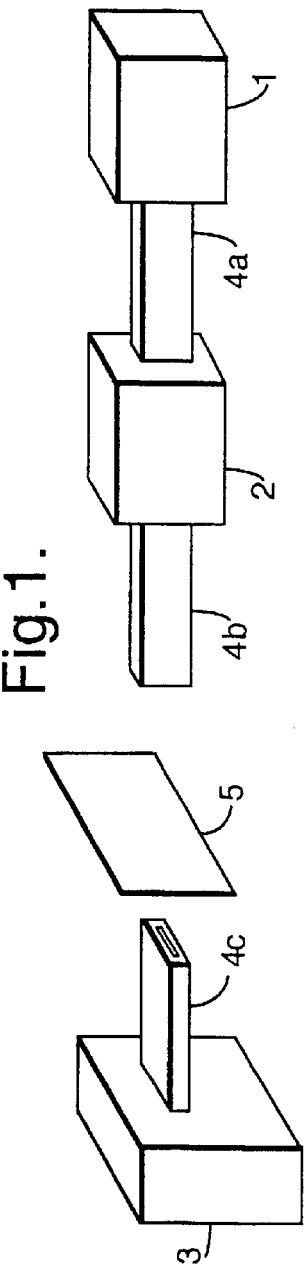
FIG. 1 shows a schematic representation of apparatus of the invention.

Referring to FIG. 1, a specific embodiment of the invention includes a microwave source 1 providing microwave radiation, an attenuator 2, a microwave detector 3 and various waveguides 4a, 4b, 4c. The source 1 may be any microwave source which may be coupled to a waveguide 4a. A suitable microwave detector 3 may be any microwave detector which may be coupled to a suitable waveguide.

During operation microwave radiation produced by source 1 passes via waveguide 4a to attenuator 2 which reduces the power to a safer level of about 1 mW. The attenuated radiation is directed, by waveguide antenna 4b, toward an object 5 to be identified. The attenuator is included in the arrangement to reduce the power of microwave radiation arriving at the detector 3. Therefore, for some applications the attenuator 2 may not be required. This will depend on the output power of the source 1.

Waveguide antenna 4b is arranged so as to launch a plane polarised wave. Hence, radiation which emerges from waveguide antenna 4b is substantially polarised along the direction of the short axis of its cross-section. Waveguide antenna 4c is orientated with the long axis of its cross-section substantially orthogonal to that of waveguide antenna 4b and hence favours transmission of radiation polarised in a plane orthogonal to that emerging from the latter. Therefore, in the absence of any influence which changes the plane of polarisation of said emerging radiation, a relatively small amount passes via waveguide antenna 4c to detector 3 causing the latter to produce a relatively weak signal.

Objects are endowed with features which switch the plane of polarisation of microwave radiation to an orthogonal orientation and on introduction of such an object 5 between waveguide antennas 4b and 4c, a significant increase in the signal produced by detector 3 is seen. The strength of the signal produced by detector 3 depends on the actual physical separation of the waveguide antennas 4b and 4c. The optimum physical separation will depend on, for example, the strength of the microwave source and the sensitivity of the detector.

The output of detector 3 may be subject to further data processing by means not shown. Moreover the introduction of objects between antennas 4b and 4c, along with their counting, can be automated by means which are known in the art, as could the sorting of objects after identification.

The launching of an electromagnetic wave into free space in the vicinity of the object or article to be identified may be achieved via means of any suitable antenna that is an antenna which generates a plane polarised wave, such as the waveguide antenna 4b illustrated in FIG. 1.

For the purpose of this specification, the phrase "antenna" shall be taken to mean any means for transmitting or receiving microwave radiation into or from free space. An open ended waveguide, having a relatively long axis and a relatively short axis is one form of antenna suitable for use in the invention. Other suitable antennas may be open ended transmission lines, such as a coaxial line, microstrip or stripline dipoles or mono poles terminating waveguides, arrays of dipoles or monpoles or printed forms of dipoles, monopoles or arrays.

The phrase "wave guide" shall be taken to mean any artificial means for propagating an electromagnetic wave, and may be a metal tubular guide of rectangular or circular cross section, dielectric guide, printed guides such as stripline, microstripline, coplanar stripline, coplanar waveguide, or coaxial line.

Figure 2A:
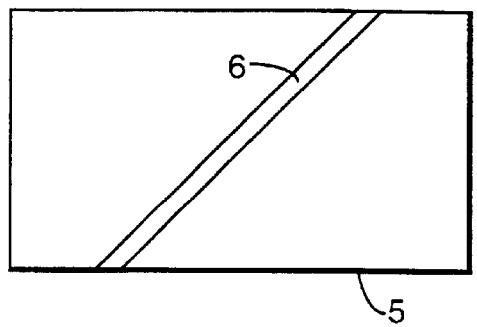
FIGS. 2 and 3 illustrate examples of polarisation switching features which may be used with the current invention.
Figure 2B:
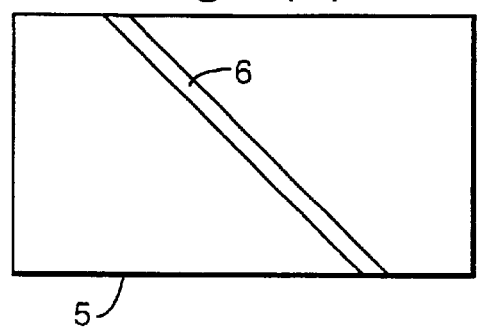

Referring to FIG. 2, an example of a polarisation switching structure comprises a metallic linear strip 6 angled at approximately 45° to the electric field of the plane polarised radiation. Other features which have an edge so orientated (for example a slot) would similarly effect such switching. Both orientations (a) and (b) of the linear strip 6 will cause polarisation switching.

Upon location of such a feature between a transmitting antenna 4b and receiving antenna 4c (as shown in FIG. 1), the E-field from transmitter antenna 4b drives an electric current in the feature. Since this is constrained by the feature edges, a current component results which is orthogonal to the incident E-field.

Re-radiation and or direct coupling to the receiving antenna results in significant power transfer.

Feature edges which are parallel with, or orthogonal to, the long axes of the cross-sections of waveguide antennas 4b or 4c do not cause coupling between the antennas because they can not change the plane of polarisation. Any edge oriented at a non-zero angle to the long axes of the crossed waveguide antennas 4b or 4b will cause coupling. However, an edge angled at 45° will give the greatest effect. This is therefore the preferred angle of orientation of the feature edge.

Figure 3A:
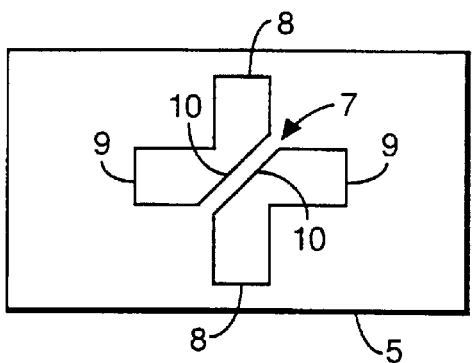
Figure 3B:
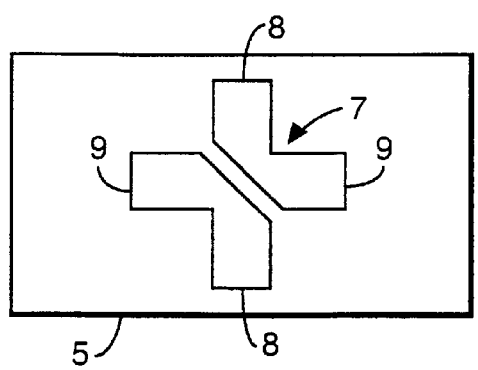

The switching structure illustrated in FIG. 3 is derived from a crossed dipole antennae structure 7 orientated with dipole arms 8,9 parallel to the E-fields in the waveguide 4b and 4c.

For the orientations of the antennas shown in FIG. 1, horizontal dipole arms 9 receive power from transmitting antenna 4b and this drives currents into vertical dipole arms 8 by virtue of the diagonal cut 10 at the centre of the structure. Dipole arms 8 in turn reradiate with vertical polarisation. Both orientations (a) and (b) of the structure 7 shown in FIG. 3 will cause polarisation switching.

Polarisation switching features such as those illustrated may be produced using conventional thin film metallisation techniques. The foil may also incorporate optical security features such as holograms.

Figure 4:
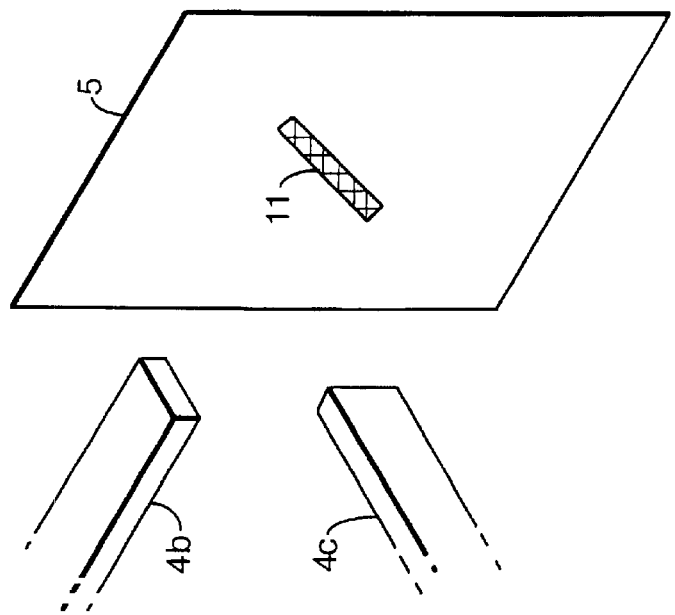
FIG. 4 shows a schematic representation of means for determining orientation which may be used with the present invention.

The apparatus illustrated in FIG. 1 operates in transmission mode, that is the polarisation properties of the radiation are modified as it passes through an object to which a polarisation switching feature 6,7 is applied. Referring to FIG. 4, the invention can also be used in reflection mode. In this mode the transmitting and receiving antennas, 4b and 4c respectively, are located on the same side of the object 5 to be identified which includes an element 11 which reflects the radiation as well as switching its plane of polarisation.

The respective orientations of antennas 4b are such that receiving antenna 4c favours reception of radiation which has been reflected from, and had its plane of polarisation switched by, element 11.

In a further preferred embodiment, the invention may also comprise means for determining the orientation of the polarisation switching structrure. Referring back to FIG. 1, the polarised field generated by antenna 4b induces a current in the polarisation switching structure, for example the linear metallic strip 6 in FIG. 2 or the crossed dipole antenna structure 7 in FIG. 3. The current induced in the structure 6,7 is confined by the shape of the structrure 6,7 to oscillate at an angle to the waveguide so that a perpendicular field is induced in the detection waveguide 4c.

Therefore, referring to FIGS. 2 and 3, both orientations (a) and (b) of the structure 6,7 will induce a field of the opposite direction in the detection antenna 4c. However, since the output from a square law detector is proportional to $\sin^2(2\theta)$, where $\theta$ is the angle between the object and the incident field direction, a square law detector cannot distinguish between the two possible orientations of the structure 6,7 shown in FIGS. 2 and 3 respectively.

The circuit diagram shown in FIG. 5 provides a means for determining the orientation of the structure 6,7 without any ambiguity. The circuit comprises the source 1 of microwave energy, a coupler 12, a transmitting antenna 13, a receiving antenna 14, a mixer 15 and a low pass filter 16. This combination forms a conventional Homodyne receiver.

In order to determine the orientation of the polarisation switching structure 6,7 (represented by arrow 17 to indicate the orientation) present in the object 5 (see FIGS. 2, 3 or 4), the object 5 is located between the transmitting antenna 13 and the receiving antenna 14. The DC output from the circuit 18 will be dependent on $\sin(2\theta)$, rather than $\sin^2(2\theta)$. Hence, the output 18 obtained for two structures in orthogonal orientations will be different, as the output will have a different sign. The two orientations can therefore be distinguished. This provides an additional level of complexity.

Using the arrangement shown in FIG. 5, several features 6,7 (of FIGS. 2 and 3 respectively may be applied to an object, where the arrangement of the orientation of each feature provides a digital code. This code provides an additional level of coding for identification purposes. For example, a series of features may be applied to the object 5 where adjacent features have different orientations. Positive identification is only achieved when successively measured features present the appropriate orientations to the detector.

FIG. 6 illustrates how the arrangement shown in FIG. 5 may be incorporated into the arrangement shown in FIG. 1 (the attenuator 2 shown in FIG. 1 has been omitted in this illustration). The mixer 15 shown in FIG. 6 forms the detection means (i.e. detector 3 in FIG. 1).

Polarisation switching features may also be constructed in other ways, without using metal foils. Switching effects are to be expected from any conducting feature with a suitable geometry (on or within an object) and could be based on, for example, conduction inks, conducting oxides, metal fibres or carbon fibres. Effects can also be observed with insulating features if there is a sufficient dielectric contrast. It may be advantageous to us dielectric inks as they can be easier to manufacture than conducting inks.

Preferably, the relative permittivity of the material used to form the polarisation switching feature, $\epsilon_r$, will be somewhat greater than 1 (the permittivity of free space). Typically, $\epsilon_r$ may be between 10 and 20, the choice of an appropriate value ultimately depending on the sensitivity of the detection means to be employed.

In another embodiment, the invention may comprise additional means for providing a disguised polarisation switching feature 6,7. For example, a series of metal features, such as features 6,7 shown in FIGS. 2 and 3, may be applied to an object. These features are visibly observable. In addition, a conducting layer may be arranged over selected features according to a particular code. A typical coating which may be used is a conducting ink, a metal oxide film such Indium Tin Oxide (ITO), or a dielectric material. For a feature based upon a patterned dielectric material, an overlaid conducting or dielectric layer may also be used.

If a metal oxide layer such as ITO is used, which is transparent in the optical spectrum, the metal features are still visibly observable. However, the conductive path through the additional metal oxide coating shorts out the microwave radiation such that for features to which the additional coating is applied, no transmission of microwave radiation is detected. An object having the same visible metal features would not give rise to the required identification code unless the metal oxide conducting layer was applied in the correct pattern.

An electrically conducting layer may be used in the presence of an optically identical, non-conducting ink, thus obscuring the coding state from optical or visual means of detection (including the human eye).

In a further embodiment of the invention, the application of a conducting metal oxide layer to selected features may be employed in combination with features having a coded arrangement of feature orientations. This provides a more complex identification coding.

For the purpose of this specification, the phrase "identification code" shall be taken to mean a pattern or arrangement of signals corresponding to a particular arrangement or pattern of features applied to an article which may be used to identify the article, and includes a pattern or arrangement of signals which comprise null signals (i.e. corresponding to the detection of no microwave radiation) and signals comprising feature orientation information.

What is claimed is:

1. Apparatus for the identification of articles endowed with polarisation changing means for changing the plane of polarisation of radiation incident on the article from a first plane of polarisation to a second plane of polarisation, comprising;
   a source of non-randomly polarised microwave radiation having said first plane of polarisation, and
   a detector comprising at least two pairs of dipole arms, each pair of dipole arms is substantially parallel to a different one of the first plane of polarisation and the second plane of polarisation, said detector located on said article, said detector for detecting the change in polarisation properties of the radiation,
   wherein the polarisation changing means comprise means for changing the properties on transmission therethrough.

2. Apparatus according to claim 1, comprising a transmitting antenna and a receiving antenna connected to suitable microwave radiation detecting means, the receiving antenna being arranged to favour reception of microwave radiation having the second plane of polarisation.

3. Apparatus according to claim 1, wherein the first and second planes of polarisation are substantially orthogonal.

4. Apparatus according to claim 3 wherein at least one of the transmitting and receiving antennas is a waveguide.

5. Apparatus according to claim 1 wherein the polarisation changing means comprise any one of a conducting foil, a conducting ink, a conducting oxide, a metal fibre or a carbon fibre.

6. Apparatus for the identification of articles endowed with polarisation changing means for changing the polarisation properties of radiation incident on the article, comprising;

a source of non-randomly polarised microwave radiation, detection means for detecting the change in polarisation properties of the radiation, wherein the polarisation changing means comprise an insulating material.

7. Apparatus for the identification of articles endowed with polarisation changing means for changing the polarisation properties of radiation incident on the article, comprising;

a source of non-randomly polarised microwave radiation, detection means for detecting the change in polarisation properties of the radiation, wherein the polarisation changing means further comprise covert means for preventing the changing of the polarisation properties by the polarisation changing means in one or more selected location, wherein the arrangement of the one or more selected location provides an identification code.

8. Apparatus according to claim 7, wherein the polarisation changing means comprise a plurality of features for changing the polarisation properties of the radiation, whereby one or more selected feature has applied thereto covert means for preventing the changing of the polarisation properties by the one or more selected feature or features.

9. Apparatus according to claim 8, wherein the covert means for preventing the changing of the polarisation properties comprise one or more layer of conducting material.

10. A method for identifying articles comprising the steps of, (i) endowing articles to be identified with polarisation changing means for changing the polarisation properties of non-randomly polarised microwave radiation, said polarisation changing means comprising at least two pairs of dipole arms, each pair of dipole arms is substantially parallel to a different one of a first plane of polarisation and a second plane of polarisation, (ii) illuminating articles with non-randomly polarised microwave radiation having said first plane of polarisation and (iii) detecting radiation reflected or transmitted by the polarisation changing means in said ssecond plane of polarisation.

11. A mark for use in the identification of articles comprising a polarisation changing means for changing the polarisation of radiation incident on the mark from a first plane of polarisation to a second plane of polarisation, said polarisation changing means having at least one feature comprising at least a first pair of dipole arms substantially parallel to said first plane of polarisation and a second pair of dipole arms substantially parallel to said second plane of polarisation and wherein said first dipole arm pair is operably connected to said second dipole arm pair.

12. A mark for use in the identification of articles comprising a polarisation changing means for changing the polarisation of radiation incident on the mark from a first plane of polarisation to a second plane of polarisation, said polarisation changing means comprising an insulating material.

13. A mark for use in the identification of articles comprising at least one features for changing the polarisation properties of radiation incident on the mark wherein the mark further comprises covert means for preventing the changing the polarisation properties by the polarisation changing means in one or more selected locations, wherein the arrangement of the one or more selected locations provides an identification code.

* * * * *